United States Patent Office 3,483,278
Patented Dec. 9, 1969

---

3,483,278
MONOADDUCTS OF ALKYLTHIOPHOSPHORIC ACIDS AND PROCESS FOR PREPARING SAME
Wolfgang H. Mueller, Elizabeth, and Alexis A. Oswald, Mountainside, N.J., assignors to Esso Research and Engineering Company, a corporation of Delaware
No Drawing. Filed Jan. 25, 1966, Ser. No. 522,825
Int. Cl. C07f 9/16; A01n 9/36
U.S. Cl. 260—956                                          13 Claims

ABSTRACT OF THE DISCLOSURE

Dihydrocarbyl thiophosphoric acids are reacted with olefins such as, e.g., monoolefins, conjugated dienes, allenes, etc., or olefin derivatives such as, e.g., chlorinated olefins, to form the corresponding S-alkylated, but not the the O-alkylated, monothiophosphates. The resulting products are useful as pesticides, particularly as insecticides.

---

This invention relates to novel organo-phosphorus compounds and to a novel process for preparing same. In particular, this invention relates to the free radical addition of dihydrocarbylthiophosphoric acids to ethylenically unsaturated hydrocarbons to selectively form monoadducts thereof. More particularly, this invention relates to the monoadducts prepared from O,O'-dialkyl-thiophosphoric acids and diolefins, i.e., O,O'-dialkyl-S-alkenyl-thiophosphates.

The addition reactions between a dialkyldithiophosphoric acid and a variety of unsaturated organic compounds always result in the formation of a P–S–C bond, i.e., (1) 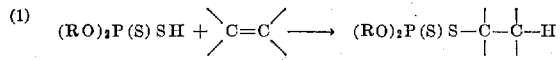

However, in the case of thiophosphoric acid additions, P–S–C and/or P–O–C bonds may be formed, i.e., the following isomers may be obtained, (2) $(RO)_2P(O)SH$ (3) $(RO)_2P(S)OH$

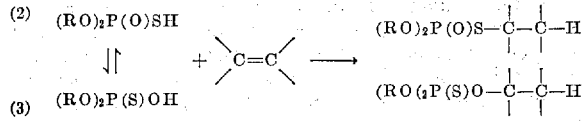

It is known that for certain applications, e.g., pesticidal, thiophosphates having the P–S–C general structure are preferred to the isomeric thionophosphates, i.e., those having the P–O–C structure. See, for example, Gerhard Schrader, "Die Entwicklung neuer Insektizider Phosphorsäure-Ester," Verlag Chemie G.m.b.H., Weinheim/Bergstr., Germany (1963).

The possible ambient nature of the dialkylthiophosphoric acid radical, $(RO)_2P(O)S\cdot \rightleftharpoons (RO)_2P(S)O\cdot$, might be expected on the basis of results obtained from the extensively studied displacement reactions with salts of dialkylthiophosphoric acids. Organic halides react with the salt of the acid to form S-alkylation products [K. Sasse, "Methoden der Organischen Chemie," Houben-Weyl. vol. XII/2, E. Müller, Ed. Georg Thieme Verlag, Stuttgart, p. 652 (1964)], e.g., (4) 

In contrast, acid chlorides react with salt of the acid to form P-alkylation products (ibid. p. 817), e.g., (5) 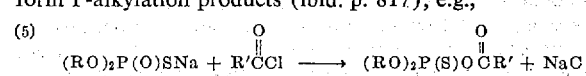

It has now been discovered that the free radical addition of dihydrocarbylthiophosphoric acids to unsaturated hydrocarbons provides a new selective method for preparing S-alkylation products, i.e., $(RO)_2P(O)SR'$. A further surprising feature of this reaction is the absence of the formation of diadduct products with diolefins. In the case of dithiophosphoric acids, an excess of acid favors the formation of the diadduct product; however, in the case of thiophosphoric acids, an excess of acid only increases the conversion of the acid to the monoadduct with no concomitant formation of the diadduct.

It is an object of the present invention to provide the art with novel monoadducts of dihydrocarbylthiophosphoric acids. Another object of the present invention is to provide a novel process for preparing these monoadducts. Yet another object of the present invention is to provide novel agricultural compositions employing the monoadducts of the present invention.

The exact nature and objects of the present invention will be more clearly perceived and fully understood by referring to the following description and claims.

The dihydrocarbylthiophosphoric acids employed to prepare the compositions of the present process can be represented by the following structural formulae:

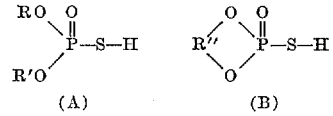

(A)                (B)

wherein R, R' and R" represent any hydrocarbon radical, monovalent or bivalent, as the case requires, such as alkyl, aryl and substituted aryl. Particularly preferred acids are those wherein R and R' are each selected from the group consisting of $C_1$–$C_{30}$ alkyl, $C_6$–$C_{10}$ aryl, $C_6$–$C_{30}$ alkaryl or aralkyl, halo-substituted $C_6$–$C_{10}$ aryl, nitro-substituted $C_6$–$C_{10}$ aryl and $C_1$–$C_4$ alkylmercapto-substituted $C_6$–$C_{10}$ aryl; and wherein R" is a $C_1$–$C_{30}$ alkylene or $C_6$–$C_8$ phenylene. Especially preferred acids are those wherein R and R' are the same and are selected from the group consisting of $C_1$–$C_3$ alkyl and $C_6$–$C_9$ aryl; and wherein R" is a $C_1$–$C_5$ alkylene.

Suitable examples of R and R' include: (a) methyl, ethyl, n-propyl, isopropyl, butyl, pentyl, octyl, decyl, pentadecyl, octadecyl, dodecyl, eicosyl, docosyl, pentacosyl and triacontyl; (b) phenyl, ethyl, phenyl, dimethylphenyl, toluyl, xylyl and naphthyl; (c) 2-chlorophenyl, 3-bromophenyl, 4-iodophenyl, o-chlorotolyl, dichlorotolyl, and 2,4-dichlorophenyl; (d) 4-nitrophenyl, 3-nitrotolyl, 2-nitro-m-xylyl, 2,5-dinitro-m-xylyl; and (e) 4-methylmer-captophenyl. Suitable examples of R" include any bivalent $C_1$–$C_{30}$ alkylene represented by the formula $C_nH_{2n}$, wherein n is an integer of from 1 to 30, e.g., methylene, ethylene, propylene, trimethylene, p-xylylene, etc.

The ethylenically unsaturated hydrocarbons employed in preparing the compositions of the present invention are, in general, the $C_3$–$C_{20}$ hydrocarbons containing at least one double bond and the analogs thereof, wherein the ethylenically linked carbon atoms are halogenated. Preferably, the ethylenically unsaturated hydrocarbons are selected from the group consisting of $C_3$–$C_{10}$ monoolefins, $C_4$–$C_{14}$ multiolefins, $C_3$–$C_{10}$ alicyclic monoolefins, $C_5$–$C_8$ cyclic diolefins, vinylic and allylic substituted $C_6$–$C_{16}$ aromatics and derivatives thereof. More preferably, the ethylenically unsaturated hydrocarbons are selected from the group consisting of allene and $C_4$–$C_{10}$ conjugated diolefins.

As examples of ethylenically unsaturated hydrocarbons which can be employed in the claimed process and compositions prepared thereby are: propene-1, butene-1, pentene-1, octene-1, decene-1, etc.; 1,3-butadiene, isoprene, piperylene, chloroprene, 1,3-hexadiene, 2,3-dimethyl-1,3-butadiene; cyclopropene, cyclobutene, cyclopentene, cyclohexene, cycloheptene, cyclooctene, and cyclododecene; cyclopentadiene, methylcyclopentadiene, cyclohexadiene, methylcyclohexadiene, and norbornene; styrene, 4-chlorostyrene, 4-methylmercaptostyrene, allylbenzene; 2,3-dimethyl-butene-2, 1,1-chloromethylpropene, 2-methylbutene-2, butene-2, 2-methylpropene, cis and trans 2-chlorobutene-2, 2,3-dichlorobutene-2, 1-chloropropene, 2-chloropropene, 1-bromopropene, 2-bromopropene, 2,3-dibromodibutene-2, allylenedichloride, 1-chloro-2-methylpropene, 1-bromo-2-methylpropene, 2-methyl-3-chlorobutene-2 and 2-methyl-3-bromobutene-2.

The mole ratio of dihydrocarbylthiophosphoric acid to the ethylenically unsaturated hydrocarbon can vary over a wide range but, in general, is between about 1:1 and about 25:1, preferably, between about 1:1 and about 2.5:1. It has been found that the use of an excess of the thiophosphoric acid serves to increase the yield of the monoadduct without concomitant formation of the diadduct. This is a most surprising result, since the use of an excess of a dithiophosphoric acid promotes the formation of the diadduct.

The temperature at which the present process is performed varies over a broad range and, in general, is between about $-100°$ C. and about $+100°$ C., preferably between about $-20°$ C. and about $+80°$ C., more preferably at about room temperature, i.e. between about $16°$ C. and about $28°$ C. The present process can also be performed over a wide range of pressures, e.g., between about 0.1 atmosphere and about 100 atmospheres, but, preferably, is carried out under atmospheric or autogenous pressures.

The present process can be carried out in the presence of an inert diluent; however, no diluent is preferably employed. Suitable diluents which can be employed if desired include: $C_2$–$C_{10}$ paraffinic hydrocarbons, $C_5$–$C_{10}$ cycloaliphatic hydrocarbons, methyl sulfide, ethers and thioethers.

The free radical catalyst employed in the present process is, in general, any of the inorganic and organic compounds which are conventionally employed as free radical initiators. In addition, nonchemical free radical initiators, such as ultraviolet light and gamma irradiation, can be employed. Ultraviolet light is preferred. Any source of ultraviolet light or gamma irradiation can be employed. In the case of ultraviolet light, a 70-watt high pressure mercury arc lamp which emits a light of wide spectrum wave length can be employed suitably in the laboratory; however, any source of ultraviolet light regardless of the quantity of wattage can be utilized. It should be noted that the more intense the source, the faster the reaction proceeds. In the case of gamma irradiation, a thousand to ten thousand Curie ($Co^{60}$) source is, for example, suitable for initiating the reaction from a distance of about 6 cm.

With respect to the chemical free radical initiators, all peroxides, hydroperoxides, per-esters, azo-compounds and peracids can be employed as the free radical initiator. Examples of suitable chemical free radical initiators include: 2,4-dichlorobenzoyl peroxide, lauroyl peroxide, methyl ethyl ketone peroxide, decanoyl peroxide, caprolyl peroxide, acetyl peroxide, benzoyl peroxide, p-chlorobenzoyl peroxide, hydroxyl heptyl peroxide, bis(1-hydroxy cyclohexyl) peroxide, dicumyl peroxide, cyclohexanone peroxide, cumene hydroperoxide, t-butyl hydroperoxide, bis-t-butyl peroxide and azo-bis-isobutyronitrile.

The amount of chemical free radical initiator employed in the present process can vary over a broad range, but, in general, will vary between 0.01 wt. percent and about 5 wt. percent, based on the total amount of reactants.

The monoadducts of the present process can be depicted by the following structural formulae:

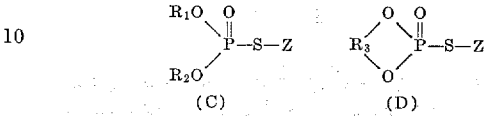

wherein $R_1$, $R_2$ and $R_3$ represent hydrocarbon radicals as described hereinabove with respect to the definition of the dihydrocarbylthiophosphoric acids, and Z is a $C_3$–$C_{30}$ hydrocarbon radical preferably selected from the group consisting of $C_3$–$C_{10}$ alkyl, $C_4$–$C_{14}$ alkenyl, $C_3$–$C_{10}$ cycloalkyl, $C_5$–$C_8$ cycloalkenyl, and $C_6$–$C_{16}$ aralkyl.

The novel compositions of the present process are useful, for example, as pesticides and synthetic chemical intermediates. The S-allyl dialkylthiophosphates produced in accordance with the present novel process are of particular interest. These composition can be represented by the following formula:

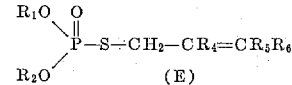

wherein $R_1$ and $R_2$ represent monovalent or bivalent hydrocarbon radicals as the case requires such as alkylaryl and substituted aryl, particularly preferred acids as those wherein $R_1$ and $R_2$ are each selected from the group consisting of $C_1$–$C_{30}$ alkyl, $C_6$–$C_{10}$ aryl, $C_6$–$C_{30}$ alkaryl or aralkyl, halogen substituted $C_6$–$C_{10}$ aryl, nitrogen substituted $C_6$–$C_{10}$ aryl and $C_1$–$C_4$ alkylmercapto substituted $C_6$–$C_{10}$ aryl and wherein $R_4$ and $R_5$ are $C_1$–$C_{11}$ alkyl, halogen such as chlorine, bromine and flourine, or hydrogen, preferably $C_1$–$C_3$ alkyl, chlorine or hydrogen, and wherein $R_6$ is a $C_1$–$C_{11}$ alkyl or hydrogen, preferably $C_1$–$C_3$ alkyl or hydrogen.

The pesticidal compositions prepared with the novel compositions of the present process can be employed in either solid or liquid form. When used in solid form, they may be reduced to an impalpable powder and applied as an undiluted dust or mixed with a solid carrier such as clay, talc and bentonite as well as other inert carriers known in the art. The pesticidal compositions can also be applied as an atomized spray or in a liquid carrier either as a solution in a solvent or as an emulsion in a nonsolvent such as water. In the diluted solid or liquid form, the compositions of the instant process can be employed in an amount of between about 0.01 and about 5.0 wt. percent based on the inert carrier. Typical liquid solvents include such compounds as acetone, ethyl alcohol, benzene, naphtha, etc. Suitable wetting agents such as long chain alcohols, sulfonated amide and ester derivatives, sulfonated aromatic and mixed alkylaryl derivatives, esters of fatty acids and petroleum sulfonates of $C_{10}$–$C_{20}$ nonionic emulsifying agents, can also be employed in preparing the pesticidal compositions. The compounds of the present process can also be admixed with carriers that are themselves pesticides.

The inventive process is more particularly described in the following examples which are intended as illustrative only since numerous modifications and variations therein will be apparent to those skilled in the art.

EXAMPLE 1

A mixture of 17 grams (0.1 mole) of O,O'-diethylthiophosphoric acid and 7 grams (0.1 mole) of 1-pentene was irradiated in a quartz tube with ultraviolet light for 38 hours at $17°$ C. N.M.R. indicated a 50% conversion with practically quantitative selectivity to O,O'-diethyl-S-n-pentyl-thiophosphate. After removal of the unreacted acid by washing with 5% sodium bicarbonate solution, and evaporation of the excess 1-pentene at 30° C./10 mm. Hg, 99 grams (41% yield) were obtained as a yellow liquid. The crude monoadduct was distilled, B.P. 88–99° C./0.18 mm. Hg, affording a colorless product, which was essentially pure on gas liquid partition chromatographic (G.L.C.) analysis.

EXAMPLE 4

The procedure of Examples 1, 2 and 3 were repeated using O,O'-diisopropylthiophosphoric acid in place of the O,O'-diethyldithiophosphoric acid. Similar results as those obtained in Examples 1–3 were observed. A summary of the results obtained in Examples 1–4 are tabulated in Table II.

TABLE II.—DIETHYL- AND DIISOPROPYLTHIOPHOSPHORIC ACID-OLEFIN MONO-ADDITIONS
$(RO)_2P(O)SR'$

| Olefin | Thiophosphoric Acid | Mole Ratio Thio-Acid per Mole Olefin | Conversion,[a] Mole Percent | Selectivity[b] for Adduct, Percent | Adduct Structure R' | R | Summary Formula |
|---|---|---|---|---|---|---|---|
| 1-pentene | $(C_2H_5O)_2P(O)SH$ | 1:1 | 41 | 100 | n-$C_5H_{11}$ | $C_2H_5$ | $C_9H_{21}O_3PS$ |
|  | $[(CH_3)_2CHO]_2P(O)SH$ | 1:1 | 43 | 100 | n-$C_5H_{11}$ | i-$C_3H_7$ | $C_{11}H_{25}O_3PS$ |
| 1,3-butadiene | $(C_2H_5O)_2P(O)SH$ | 2:1 | 43 | <91 | $CH_2CH=CHCH_3$ | $C_2H_5$ | $C_8H_{17}O_3PS$ |
|  | $[(CH_3)_2CHO]_2P(O)SH$ | 2:1 | 52 | <88 | $CH_2CH=CHCH_3$ | i-$C_3H_7$ | $C_{10}H_{21}O_3PS$ |
| Allene | $(C_2H_5O)_2P(O)SH$ | 2:1 | 62 | 84 | $CH_2CH=CH_2$ | $C_2H_5$ | $C_7H_{15}O_3PS$ |
|  | $[(CH_3)_2CHO]_2P(O)SH$ | 2:1 | 52 | 85 | $CH_2CH=CH_2$ | i-$C_3H_7$ | $C_9H_{19}O_3PS$ |

| Olefin | B.P. Uncorr., °C./mm. Hg | $n_D^{20}$ | Adduct Elemental composition Calculated C | H | P | S | Found C | H | P | S |
|---|---|---|---|---|---|---|---|---|---|---|
| 1-pentene | 88–89 (0.18) | 1.4583 | 44.99 | 8.75 | 12.90 | 13.35 | 45.10 | 9.03 | 12.37 | 13.74 |
|  | 85–86 (0.15) | 1.4525 | 49.23 | 9.39 | 11.54 | 11.95 | 49.53 | 9.13 | 11.40 | 11.88 |
| 1,3-butadiene | 79.5–80 (0.18) | 1.4759 | 42.86 | 7.59 | 13.84 | 14.28 | 43.19 | 7.66 | 13.80 | 14.43 |
|  | 68–69 (0.07) | 1.4670 | 47.62 | 8.33 | 12.30 | 12.70 | 47.28 | 8.25 | 11.93 | 12.83 |
| Allene | 70–70.5 (0.25) | 1.4724 | 40.00 | 7.14 | 14.76 | 15.23 | 40.27 | 7.12 | 14.80 | 15.18 |
|  | 62–63 (0.13) | 1.4637 | 45.36 | 8.04 | 12.99 | 13.45 | 45.71 | 8.10 | 12.68 | 13.48 |

[a] Based on weight of product isolated, semiquantitative N.M.R. analyses before work-up indicated 5–10% higher conversions.
[b] Area percent obtained from G.L.C. analyses.

Complete conversion of the olefin to the corresponding S-n-pentyl-thiophosphate was observed using a one-molar excess of diethylthiophosphoric acid under the same conditions.

TABLE I.—INCREASE OF ADDUCT FORMATION WITH EXCESS O,O'-DIETHYLTHIOPHOSPHORIC ACID
$C_3H_7CH=CH_2+(C_2H_5O)_2P(O)SH \rightarrow (C_2H_5O)_2P(O)SC_5H_{11}$

| Excess Thioacid, percent: | Yield of adduct, percent Found [a] | Calcd.[b] |
|---|---|---|
| 0 | 50 | 50 |
| 25 | 63 | 62.5 |
| 75 | 92 | 87.5 |
| 100 | 100 | 100 |

[a] Semiquantitative N.M.R. analyses and/or titration of excess acid with 0.1 N·NaOH.
[b] Based on the assumption that two moles of acid are necessary for the formation of one mole of adduct.

EXAMPLE 2

A mixture of 34 grams (0.2 mole) of O,O'-diethylthiophosphoric acid and 5.9 grams (0.1 mole) of butadiene was irradiated with ultraviolet light in a sealed quartz tube under moderate pressure at 17° C. for 42 hours. Semiquantitative N.M.R. analysis of the reaction mixture indicated 50 mole percent (based on butadiene) of the expected O,O'-diethyl-S-(2-butenyl)-thiophosphate and no diadduct. The unreacted butadiene was removed under vacuum and the excess acid with 5% sodium bicarbonate solution. The residual monoadduct was a yellow liquid (11.5 grams; 43% yield based on butadiene) which was found to be 92% pure by G.L.C. analysis.

EXAMPLE 3

Allene (2 grams; 0.05 mole) and O,O'-diethylthiophosphoric acid (17 grams; 0.1 mole) were reacted and worked up under the same conditions as described in Example 2. Semiquantitative N.M.R. analysis of the crude reaction mixture indicated 55–60 mole percent (based on allene) of monoadduct. Workup afforded 6.55 grams (62% yield based on allene) of a yellow oily residue. N.M.R. and G.L.C. analysis showed 84% of the S-allyl-thiophosphate.

Examples 1–4 and the data contained in Table II show that the selective free radical addition of dialkylthiophosphoric acids to olefins results in high yields of the monoadduct which is characterized by the P–S–C structure. The data further show that a molar excess of the thiophosphoric acid does not produce a diadduct but increases the yield of the monoadduct.

EXAMPLE 5

2,3-dichlorobutene-2 and O,O' - diethylthiophosphoric acid are reacted and worked under similar conditions as described in Example 2, thereby providing S-2, 3-dichlorobutene-2-thiophosphate.

EXAMPLE 6

The compositions of Examples 2 and 3 were dissolved in acetone and dispersed in distilled water with Triton X–100 emulsifier (an alkyl aryl polyether alcohol) to give spray emulsions of 0.05 and 0.01 wt. percent concentration. These emulsions were used in standard laboratory insecticidal tests. Test methods are described below.

*Housefly tests*—Fifty adults of the CSMA (Chemical Specialties Manufacturers' Association) strain were sprayed in a two-inch by five-inch diameter stainless steel cage faced on top and bottom with 14 mesh screen. Flies were retained in the cage in which they were sprayed for 24-hour mortality determinations. Mortality which results from this test may be from residual contact as well as by direct contact spray. DDT at 0.05% concentration was used as the positive standard.

*Systemic tests.*—Twenty ml. spray emulsion was applied to the vermiculite substratum of potted pea plants. Forty-eight hours after application the plants were infested with ten adult pea aphids. Mortality determination was made after five days. Demeton at 0.01% concentration was used as the positive standard.

Determination of the systemic effect on strawberry spider mite was carried out in a similar manner using lima bean plants.

*Mexican Bean Beetle tests.*—Lima bean leaves sprayed on the dorsal and ventral surfaces were offered to the Mexican bean beetle (late second instar) for a 48-hour feeding. The feeding rate and mortality data were recorded as well as foliage injury, if any. A positive standard was 0.1% methoxychlor.

The data obtained as a result of the experiments described in Example 6 are shown in Table III.

TABLE III

| | Compound | | Mortality, percent | | | |
|---|---|---|---|---|---|---|
| Example | Structure | Conc., percent | House Flies (24 hrs.) | Pea Aphids Systemic (5 days) | Mexican Bean Beetles (48 hrs.) | Mites Systemic (5 days) |
| 2 | $(C_2H_5O)_2P(O)SCH_2CH=CHCH_3$ | 0.05 | 98 | 90 | 20 | |
| 3 | $(C_2H_5O)_2P(O)SCH_2CH=CH_2$ | 0.05 | 52 | 100 | 90 | |
| | | 0.01 | 0 | 10 | 100 | 100 |

While there are above-described a number of specific embodiments of the present invention, it is obviously possible to produce other embodiments of various equivalent modifications and variations thereof without departing from the spirit of the invention.

What is claimed is:

1. S-allyl dialkylthiophosphates having the formula, $$\begin{bmatrix} R_1O & O \\ & \diagdown \| \\ & P-S-CH_2-CR_3=CR_4R_5 \\ & \diagup \\ R_2O & \end{bmatrix}$$

$$\begin{matrix} R_1O & O \\ \diagdown \| \\ P-S-CH_2-CR_4=CR_5R_6 \\ \diagup \\ R_2O & \end{matrix}$$

wherein $R_1$ and $R_2$ are each selected from the group consisting of $C_1$–$C_{30}$ alkyl, $C_6$–$C_{10}$ aryl, $C_6$–$C_{30}$ alkaryl and aralkyl, halo-substituted $C_6$–$C_{10}$ aryl, nitro-substituted $C_6$–$C_{10}$ aryl, and $C_1$–$C_4$ alkylmercapto substituted $C_6$–$C_{10}$ aryl; $R_4$ and $R_5$ are selected from the group consisting of hydrogen and $C_1$–$C_{11}$ alkyl; and $R_6$ is $C_1$–$C_{11}$ alkyl.

2. S-crotyl diethylthiophosphate.

3. A process which comprises reacting a dihydrocarbylthiophosphoric acid selected from the group consisting of compounds represented by the following structural formulae:

$$\begin{matrix} R_1O & O & & & O & O \\ \diagdown \| & & & \diagup & \diagdown \| \\ P-S-H & \text{and} & R_3 & & P-S-H \\ \diagup & & & \diagdown & \diagup \\ R_2O & & & & O \end{matrix}$$

(A)          (B)

wherein $R_1$ and $R_2$ are each selected from the group consisting of $C_1$–$C_{30}$ alkyl, $C_6$–$C_{10}$ aryl, $C_6$–$C_{30}$ alkaryl, $C_6$–$C_{30}$ aralkyl, halo-substituted $C_6$–$C_{10}$ aryl, nitro-substituted $C_6$–$C_{10}$ aryl, and $C_1$–$C_4$ alkylmercapto substituted $C_6$–$C_{10}$ aryl; and $R_3$ is selected from the group consisting of $C_1$–$C_{30}$ alkylene and $C_6$–$C_8$ phenylene; with a $C_3$–$C_{30}$ ethylenically unsaturated compound selected from the group consisting of $C_3$–$C_{30}$ ethylenically unsaturated hydrocarbons, chlorinated $C_3$–$C_{30}$ ethylenically unsaturated hydrocarbons and brominated $C_3$–$C_{30}$ ethylenically unsaturated hydrocarbons in the presence of a free radical initiator at a temperature of between about −100° C. and about 100° C.

4. The process according to claim 3 wherein said ethylenically unsaturated compound is selected from the group consisting of monoolefins, diolefins, chlorinated mono- and diolefins, and brominated mono- and diolefins.

5. The process according to claim 3 wherein said ethylenically unsaturated compound is a $C_3$–$C_{30}$ hydrocarbon containing from one to three double bonds.

6. The process according to claim 3 wherein said ethylenically unsaturated compound is selected from the group consisting of $C_3$–$C_{10}$ monoolefins, $C_4$–$C_{14}$ diolefins, $C_4$–$C_{14}$ triolefins, $C_3$–$C_{12}$ alicyclic monoolefins, $C_5$–$C_8$ cyclic diolefins and vinylic and allylic substituted $C_6$–$C_{16}$ aromatics.

7. The process according to claim 3 wherein said ethylenically unsaturated hydrocarbon is selected from the group consisting of allene and $C_4$–$C_{10}$ conjugated diolefins.

8. The process according to claim 3 wherein said reaction temperature is between about −20° C. and about 80° C.

9. The process according to claim 3 wherein said reaction temperature is room temperature.

10. The process according to claim 3 wherein said free radical initiator is ultraviolet light.

11. The process according to claim 3 wherein the mole ratio of the dihydrocarbylthiophosphoric acid to hydrocarbon is at least 1:1.

12. The process according to claim 3 wherein the mole ratio of the dihydrocarbylthiophosphoric acid to hydrocarbon is between 1:1 and about 2.5:1.

13. A process which comprises reacting a dihydrocarbylthiophosphoric acid selected from the group consisting of compounds represented by the following structural formulae:

$$\begin{matrix} R_1O & O & & & O & O \\ \diagdown \| & & & \diagup & \diagdown \| \\ P-S-H & \text{and} & R_3 & & P-S-H \\ \diagup & & & \diagdown & \diagup \\ R_2O & & & & O \end{matrix}$$

(A)          (B)

wherein $R_1$ and $R_2$ are the same and are selected from the group consisting of $C_1$–$C_3$ alkyl and $C_6$–$C_9$ aryl; and $R_3$ is selected from the group consisting of $C_1$–$C_{30}$ alkylene and $C_6$–$C_8$ phenylene; with a $C_3$–$C_{30}$ ethylenically unsaturated compound selected from the group consisting of $C_3$–$C_{30}$ ethylenically unsaturated hydrocarbons, chlorinated $C_3$–$C_{30}$ ethylenically unsaturated hydrocarbons, and brominated $C_3$–$C_{30}$ ethylenically unsaturated hydrocarbons in the presence of a free radical initiator at a temperature of between about −100° C. and about 100° C.

References Cited

UNITED STATES PATENTS 2,927,751    6/1959    Saul _____ 260—956 XR
3,153,664   10/1964   Schicke et al. _____ 260—956 XR
3,340,332    9/1967    Oswald et al. _____ 260—956

CHARLES B. PARKER, Primary Examiner

ANTON H. SUTTO, Assistant Examiner

U.S. Cl. X.R.

260—954, 936, 937, 949, 978, 958; 204—158, 162